(12) United States Patent
Lian et al.

(10) Patent No.: US 10,343,525 B2
(45) Date of Patent: Jul. 9, 2019

(54) ELECTRIC VEHICLE, ACTIVE SAFETY CONTROL SYSTEM FOR ELECTRIC VEHICLE, AND CONTROL METHOD FOR ACTIVE SAFETY CONTROL SYSTEM OF ELECTRIC VEHICLE

(71) Applicant: BYD COMPANY LIMITED, Shenzhen, Guangdong (CN)

(72) Inventors: Yubo Lian, Guangdong (CN); Hongbin Luo, Guangdong (CN); Jintao Zhang, Guangdong (CN); Dongsheng Yang, Guangdong (CN); Haijun Lv, Guangdong (CN)

(73) Assignee: BYD COMPANY LIMITED (CN)

( * ) Notice: Subject to any disclaimer, the term of this patent is extended or adjusted under 35 U.S.C. 154(b) by 142 days.

(21) Appl. No.: 15/518,928

(22) PCT Filed: Dec. 16, 2015

(86) PCT No.: PCT/CN2015/097642
§ 371 (c)(1),
(2) Date: Apr. 13, 2017

(87) PCT Pub. No.: WO2016/095825
PCT Pub. Date: Jun. 23, 2016

(65) Prior Publication Data
US 2017/0232848 A1 Aug. 17, 2017

(30) Foreign Application Priority Data
Dec. 16, 2014 (CN) .......................... 2014 1 0784284

(51) Int. Cl.
*B60L 3/10* (2006.01)
*B60L 3/12* (2006.01)
(Continued)

(52) U.S. Cl.
CPC ............ *B60L 3/102* (2013.01); *B60K 17/356* (2013.01); *B60L 3/106* (2013.01); *B60L 3/12* (2013.01);
(Continued)

(58) Field of Classification Search
None
See application file for complete search history.

(56) References Cited

U.S. PATENT DOCUMENTS 5,554,969 A * 9/1996 Eguchi .................. B62D 5/049
180/236
5,689,170 A * 11/1997 Ishikawa ............... B60L 3/0023
318/799
(Continued)

FOREIGN PATENT DOCUMENTS

CN 101298256 A 11/2008
CN 101353011 A 1/2009
(Continued)

OTHER PUBLICATIONS

Google patents english translation of "Method for detecting error of battery for a electric vehicle" KR20020054779A (https://patents.google.com/patent/KR20020054779A/en) (Jul. 8, 2002)(downloaded on Sep. 4, 2018).*
(Continued)

*Primary Examiner* — Jean Paul Cass
(74) *Attorney, Agent, or Firm* — Calfee, Halter & Griswold LLP

(57) ABSTRACT

The present disclosure discloses an electric vehicle, an active safety control system of an electric vehicle, and a control method of the active safety control system of an electric vehicle. The electric vehicle includes: multiple wheels, multiple motors, a wheel speed detection module, a steering wheel rotation angle sensor, a yaw rate sensor, and
(Continued)

a battery pack. The active safety control system includes: an acquisition module, acquiring the wheel speed signal, the direction information, the yaw information, status information of the battery pack, and status information of the multiple motors; a status determining module, determining status of the electric vehicle; and a control module, generating a control instruction and delivering the control instruction to at least one motor.

11 Claims, 7 Drawing Sheets

(51) Int. Cl.
    *B60L 15/36*     (2006.01)
    *B60L 58/10*     (2019.01)
    *B60W 10/08*     (2006.01)
    *B60W 30/02*     (2012.01)
    *B60W 30/18*     (2012.01)
    *B60K 17/356*     (2006.01)
    *B60W 10/184*     (2012.01)
    *B60W 10/192*     (2012.01)

(52) U.S. Cl.
    CPC .............. *B60L 15/36* (2013.01); *B60L 58/10* (2019.02); *B60W 10/08* (2013.01); *B60W 10/184* (2013.01); *B60W 10/192* (2013.01); *B60W 30/02* (2013.01); *B60W 30/18145* (2013.01); *B60W 30/18172* (2013.01); *B60W 2520/125* (2013.01); *B60W 2520/14* (2013.01); *B60W 2520/20* (2013.01); *B60W 2520/28* (2013.01); *B60W 2540/18* (2013.01); *B60W 2710/08* (2013.01); *B60W 2710/083* (2013.01); *B60W 2710/18* (2013.01); *B60W 2720/14* (2013.01); *B60W 2720/20* (2013.01); *B60Y 2200/91* (2013.01); *Y02T 10/646* (2013.01); *Y02T 10/7005* (2013.01); *Y02T 10/705* (2013.01); *Y02T 10/7258* (2013.01)

(56) References Cited

U.S. PATENT DOCUMENTS

| | | | | |
|---|---|---|---|---|
| 5,969,499 | A * | 10/1999 | Shaffer | H02P 23/0004 318/800 |
| 6,208,041 | B1 * | 3/2001 | Majumdar | H03K 17/122 307/113 |
| 6,229,719 | B1 * | 5/2001 | Sakai | H02P 21/22 318/432 |
| 6,281,659 | B1 * | 8/2001 | Giuseppe | H02P 21/16 318/727 |
| 6,333,614 | B1 * | 12/2001 | Kerner | G05B 9/03 318/602 |
| 6,359,405 | B1 * | 3/2002 | Tsurumi | B60K 6/485 318/434 |
| 6,411,005 | B1 * | 6/2002 | Strangas | H02K 1/16 310/164 |
| 6,448,731 | B1 * | 9/2002 | Miller | B62D 5/046 318/488 |
| 6,618,637 | B1 * | 9/2003 | Kerner | G05B 19/408 370/400 |
| 6,714,424 | B2 * | 3/2004 | Deng | H02M 7/53803 363/17 |
| 7,116,068 | B2 * | 10/2006 | Boesch | H02K 21/00 318/400.15 |
| 7,116,077 | B2 * | 10/2006 | Raftari | B60W 20/50 318/798 |
| 7,385,365 | B2 * | 6/2008 | Feick | H02P 29/02 318/400.01 |
| 7,453,231 | B2 * | 11/2008 | Maruyama | B60L 15/025 318/807 |
| 7,739,005 | B1 * | 6/2010 | Tang | B60L 3/10 701/22 |
| 7,782,000 | B2 * | 8/2010 | Suzuki | B62D 5/0484 180/443 |
| 7,813,089 | B2 * | 10/2010 | Suzuki | B62D 5/046 180/443 |
| 7,813,626 | B2 * | 10/2010 | Suzuki | B62D 5/046 318/400.02 |
| 7,843,154 | B2 * | 11/2010 | Suzuki | B62D 5/046 318/400.02 |
| 7,859,206 | B2 * | 12/2010 | Suzuki | B62D 5/046 318/400.02 |
| 7,880,417 | B2 * | 2/2011 | Suzuki | B62D 5/0487 318/400.02 |
| 7,917,257 | B2 * | 3/2011 | Kumar | B60T 8/1705 303/151 |
| 8,008,880 | B2 * | 8/2011 | Suzuki | H02P 21/16 318/400.23 |
| 8,084,972 | B2 * | 12/2011 | Strong | H02P 6/14 318/400.01 |
| 8,116,927 | B2 * | 2/2012 | Yu | B60K 6/442 701/22 |
| 8,140,206 | B2 * | 3/2012 | Bailey | B60K 6/46 701/22 |
| 8,258,939 | B2 | 9/2012 | Miller et al. | |
| 8,286,008 | B2 * | 10/2012 | Peng | H02M 3/1584 713/300 |
| 8,421,368 | B2 * | 4/2013 | Jalbout | H05B 33/0827 315/291 |
| 8,453,770 | B2 * | 6/2013 | Tang | B60L 15/2036 180/65.1 |
| 8,604,709 | B2 * | 12/2013 | Jalbout | H02M 3/157 315/291 |
| 8,626,389 | B2 | 1/2014 | Sidlosky | |
| 8,700,245 | B2 * | 4/2014 | Meitinger | B60K 6/448 180/65.1 |
| 8,718,868 | B2 * | 5/2014 | Petrucci | B62D 6/007 701/36 |
| 8,725,335 | B2 * | 5/2014 | Tolkacz | B60W 10/06 701/22 |
| 8,731,759 | B2 * | 5/2014 | Wein | B60W 10/08 318/139 |
| 8,903,577 | B2 * | 12/2014 | Jalbout | B60K 28/16 701/22 |
| 8,933,658 | B2 * | 1/2015 | Ganev | H02P 29/68 318/472 |
| 8,966,898 | B2 * | 3/2015 | Corley | F01K 23/065 60/618 |
| 9,121,361 | B2 * | 9/2015 | Shimizu | F01L 13/0026 |
| 9,270,208 | B2 * | 2/2016 | Seo | H02P 29/024 |
| 9,407,189 | B2 * | 8/2016 | Tang | H02P 6/10 |
| 9,431,951 | B2 * | 8/2016 | Tang | H02P 27/06 |
| 9,444,384 | B2 * | 9/2016 | Tang | H02P 21/30 |
| 9,463,697 | B1 * | 10/2016 | Gauthier | B60L 3/106 |
| 9,469,199 | B1 * | 10/2016 | Gauthier | B60W 30/18172 |
| 9,481,256 | B2 * | 11/2016 | Arkus | B60L 11/1809 |
| 9,509,240 | B2 * | 11/2016 | Holveck | H02P 6/181 |
| 9,751,520 | B2 * | 9/2017 | Chae | B60W 20/00 |
| 9,827,866 | B2 * | 11/2017 | Burow | B60K 1/02 |
| 9,914,444 | B2 * | 3/2018 | Sailer | B60W 10/06 |
| 10,023,073 | B2 * | 7/2018 | Lai | B60K 1/02 |
| 2003/0125847 | A1 | 7/2003 | Tinskey et al. | |
| 2006/0015236 | A1 | 1/2006 | Yamaguchi et al. | |
| 2007/0021875 | A1 | 1/2007 | Naik et al. | |
| 2008/0208406 | A1 | 8/2008 | Chen et al. | |
| 2011/0307129 | A1 | 12/2011 | Yu et al. | |
| 2013/0218388 | A1 | 8/2013 | Katsuyama | |

FOREIGN PATENT DOCUMENTS

| | | |
|---|---|---|
| CN | 201362249 Y | 12/2009 |
| CN | 102275508 A | 12/2011 |
| CN | 202448976 U | 9/2012 |
| CN | 102837616 A | 12/2012 |
| CN | 102887147 A | 1/2013 |
| CN | 102975717 A | 3/2013 |
| CN | 202827302 U | 3/2013 |

(56) References Cited

FOREIGN PATENT DOCUMENTS

| | | | |
|---|---|---|---|
| CN | 103350719 A | | 10/2013 |
| CN | 104044584 A | | 9/2014 |
| EP | 2634061 A2 | | 9/2013 |
| JP | 2010162911 A | | 7/2010 |
| JP | 2011029178 A | | 2/2011 |
| JP | 2013028329 A | | 2/2013 |
| KR | 20020054779 A | * | 7/2002 |

OTHER PUBLICATIONS

Notification of Reasons for Refusal for Japanese Patent Application No. 2017-532014 dated Jul. 30, 2018.
Search Report for European Patent Application No. 15869332 dated Oct. 25, 2017.
Search Report for International Application No. PCT/CN2015/097642 dated Feb. 23, 2016.
Anonymous: "Electronic stability control-Wikipedia", Oct. 25, 2017 (Oct. 25, 2017), XP)55419159, Retrieved from the internet: URL.: https://en.wikipedia.org/wiki/electronic_stability_control.

* cited by examiner

ELECTRIC VEHICLE, ACTIVE SAFETY CONTROL SYSTEM FOR ELECTRIC VEHICLE, AND CONTROL METHOD FOR ACTIVE SAFETY CONTROL SYSTEM OF ELECTRIC VEHICLE

CROSS REFERENCE TO RELATED APPLICATION

The present application is based upon the international Application No. PCT/CN2015/097642, filed on Dec. 16, 2015, which is based upon and claims priority to Chinese Patent Application No. 201410784284.8, filed on Dec. 16, 2014, and the entire contents thereof are incorporated herein by reference.

BACKGROUND

Technical Field

The present disclosure relates to the technical field of electric vehicles, and more particularly, to an active safety control system of an electric vehicle, a control method for an active safety control system of an electric vehicle, and an electric vehicle.

Related Art

An electronic stability program (ESP, electronic vehicle stability control system) is an electronic automobile control system that can help a driver keep a vehicle stable in a limit working condition. The ESP usually consists of a sensor system (including a steering wheel rotation angle sensor, a yaw angular speed sensor, a lateral acceleration sensor, and a wheel speed sensor), a hydraulic actuation system, and an electronic control unit (ECU). A basic principle of the ESP is to implement, according to a manipulation intention of a driver, vertical dynamics control (indirect lateral force control) on an automobile that is in a critical stable state, so as to prevent the vehicle from entering an uncontrollable unstable state, and at the same time also ensure that a manipulation characteristic of the vehicle in a limit working condition is consistent with that in a working condition in a linear region of routine driving, so that the driver can operate the vehicle according to previous driving experience in a linear region, thereby achieving an objective of controlling the vehicle.

Currently, on a conventional vehicle, a hydraulic braking system is indispensable. Therefore, an ESP on a current vehicle implements stable control of the vehicle based on hydraulic braking. However, the hydraulic braking system is relatively complex, and has a relatively slow response and a high cost.

SUMMARY

The present application is provided based on the understanding and research of the following problem by an inventor:

An automobile electronic stability control system is provided in the prior art, and includes: several wheels, several sensors, a power supply, and a control unit. The sensors send sensed signals to the control unit. The system further includes hub motors integrated with the wheels. The hub motors are connected to the power supply by using a power line. The control unit sends a control signal to the hub motors. In the solution, a braking function of the hub motors is used to replace an original hydraulic braking execution system, so as to achieve a control effect of an ESP.

As can be seen, an all-wheel drive electric automobile may perform yaw moment control by using a braking feedback characteristic of a motor, so that an effect of a hydraulic ESP may be replaced. However, requirements on high mileage and high performance of an electric automobile cause increasingly large overall vehicle mass and overall vehicle rotary inertia, and the hub motors integrated with the wheels cannot provide a sufficient regenerative braking force because of a limit of an arrangement space. Therefore, an inherent disadvantage exists in providing an active control yaw moment. Moreover, from a perspective of overall vehicle dynamics, the automobile electronic stability control system in the prior art can perform yaw control on the vehicle from only a perspective of braking, resulting in that operational stability of the vehicle is not ideal, thereby reducing safety of the vehicle.

An objective of the present disclosure is to at least resolve one of the foregoing technical disadvantages.

For this, a first objective of the present disclosure is to provide an active safety control system of an electric vehicle, so as to resolve problems of a complex system, a high cost, and a slow response speed that exist in an existing hydraulic electronic stability control system, so that operational stability and safety of a vehicle can be greatly improved.

A second objective of the present disclosure is to provide an electric vehicle. A third objective of the present disclosure is to provide a control method for an active safety control system of an electric vehicle.

To achieve the foregoing objectives, an embodiment of a first aspect of the present disclosure provides an active safety control system of an electric vehicle, where the electric vehicle includes: multiple wheels, multiple transmissions respectively connected to the multiple wheels, multiple motors that are respectively connected to the multiple transmissions to respectively correspond to the multiple wheels, a wheel speed detection module configured to detect a wheel speed of the multiple wheels to generate a wheel speed signal, a steering wheel rotation angle sensor configured to detect direction information of the electric vehicle, a yaw rate sensor configured to detect yaw information of the electric vehicle, and a battery pack. The active safety control system includes: an acquisition module, connected to the wheel speed detection module, the steering wheel rotation angle sensor, the yaw rate sensor, the battery pack, and the multiple motors, and configured to acquire the wheel speed signal, the direction information of the electric vehicle, the yaw information of the electric vehicle, status information of the battery pack, and status information of the multiple motors; a status determining module, configured to determine status of the electric vehicle according to the wheel speed signal, the direction information of the electric vehicle, and the yaw information of the electric vehicle, where the status of the electric vehicle includes that the electric vehicle has a side slip and is about to enter a side slip limit interval and that the electric vehicle is in the side slip limit interval; and a control module, configured to generate a control instruction according to the status information of the battery pack, the status information of the multiple motors, and the status of the electric vehicle, and deliver the control instruction to at least one motor, to enable the at least one motor to control at least one corresponding wheel according to the control instruction, where when the electric vehicle has a side slip and is about to enter the side slip limit interval, the control instruction enables the at least one motor to perform driving control on the at least one corresponding wheel, and when the electric vehicle is in the side slip limit interval, the control instruction enables the at least one motor to perform braking control on the at least one corresponding wheel.

For the active safety control system of an electric vehicle according to this embodiment of the present disclosure, when the electric vehicle has a side slip and is about to enter a side slip limit interval, a motor controller controls the active safety control system to enter a driving force yaw control mode, to perform yaw control on the electric vehicle by using a driving force of a motor, so as to correct an attitude of the electric vehicle, improve a turning speed of the electric vehicle, avoid a decrease in a vehicle speed caused by braking, and improve operational stability of the electric vehicle. When the electric vehicle is in the side slip limit interval, the motor controller controls the active safety control system to simultaneously enter the driving force yaw control mode and a braking force yaw control mode, to perform yaw control on the electric vehicle by using a driving force and a braking force of a corresponding motor, so as to enable the electric vehicle enter a stable state more rapidly, thereby improving safety of the electric vehicle. Therefore, in the active safety control system of an electric vehicle in this embodiment of the present disclosure, a drive architecture of an all-wheel hub motor plus a transmission plus a transmission shaft is disposed, which not only facilitates space arrangement, but also can significantly improve driving and braking feedback capabilities of the electric vehicle, so that the problems of a complex system, a high cost, and a slow response speed that exist in the existing hydraulic electronic stable control system are resolved, and operational stability and safety of a vehicle can further be greatly improved.

To achieve the foregoing objectives, an embodiment of a second aspect of the present disclosure provides a motor controller, where the motor controller includes the foregoing active safety control system of an electric vehicle.

To achieve the foregoing objectives, an embodiment of a third aspect of the present disclosure provides an electric vehicle, where the electric vehicle includes the foregoing active safety control system of an electric vehicle.

For the electric vehicle according to this embodiment of the present disclosure, when the electric vehicle has a side slip and is about to enter a side slip limit interval, an active safety control system is controlled to enter a driving force yaw control mode, to perform yaw control by using a driving force of a motor, so as to correct an attitude of the electric vehicle, improve a turning speed, avoid a decrease in a vehicle speed caused by braking, and improve operational stability. When the electric vehicle is in the side slip limit interval, the active safety control system is controlled to simultaneously enter the driving force yaw control mode and a braking force yaw control mode, to perform yaw control by using a driving force and a braking force of a corresponding motor, so as to enable the electric vehicle to enter a stable state more rapidly, thereby improving safety.

To achieve the foregoing objectives, an embodiment of a fourth aspect of the present disclosure provides a control method of an electric vehicle. The electric vehicle includes: multiple wheels, respectively multiple transmissions respectively connected to the multiple wheels, multiple motors respectively corresponding to the multiple wheels, a wheel speed detection module configured to detect a wheel speed of the multiple wheels to generate a wheel speed signal, a steering wheel rotation angle sensor configured to detect direction information of the electric vehicle, a yaw rate sensor configured to detect yaw information of the electric vehicle, and a battery pack. The control method includes the following steps: acquiring the wheel speed signal, the direction information of the electric vehicle, the yaw information of the electric vehicle, status information of the battery pack, and status information of the multiple motors; determining status of the electric vehicle according to the wheel speed signal, the direction information of the electric vehicle, and the yaw information of the electric vehicle, where the status of the electric vehicle includes that the electric vehicle has a side slip and is about to enter a side slip limit interval and that the electric vehicle is in the side slip limit interval; generating a control instruction according to the status information of the battery pack, the status information of the multiple motors, and the status of the electric vehicle, and delivering the control instruction to at least one motor, to enable the at least one motor to control at least one corresponding wheel according to the control instruction, where when the electric vehicle has a side slip and is about to enter the side slip limit interval, the control instruction enables the at least one motor to perform driving control on the at least one corresponding wheel, and when the electric vehicle is in the side slip limit interval, the control instruction enables the at least one motor to perform braking control on the at least one corresponding wheel.

For the control method for an active safety control system of an electric vehicle according to this embodiment of the present disclosure, when the electric vehicle has a side slip and is about to enter a side slip limit interval, the active safety control system is controlled to enter a driving force yaw control mode, to perform yaw control on the electric vehicle by using a driving force of a motor, so as to correct an attitude of the electric vehicle, improve a turning speed of the electric vehicle, avoid a decrease in a vehicle speed caused by braking, and improve operational stability of the electric vehicle. When the electric vehicle is in the side slip limit interval, the active safety control system is controlled to simultaneously enter the driving force yaw control mode and a braking force yaw control mode, to perform yaw control on the electric vehicle by using a driving force and a braking force of a corresponding motor, so as to enable the electric vehicle enter a stable state more rapidly, thereby improving safety of the electric vehicle.

To achieve the foregoing objectives, the present disclosure further provides an active safety control system of an electric vehicle, including: four wheels; four transmissions, each transmission being connected to each wheel by using a transmission shaft; four independently controlled motors, each motor being connected to each transmission; a wheel speed detection module, the wheel speed detection module being configured to detect a wheel speed of the electric vehicle to generate a wheel speed signal; a steering wheel rotation angle sensor and a yaw rate sensor module; a battery pack; and a motor controller, the motor controller being respectively connected to the battery pack and the four motors by using a high-voltage cable. The motor controller communicates with the wheel speed detection module, the steering wheel rotation angle sensor, and the yaw rate sensor module. The motor controller generates a control instruction according to status signals of the electric vehicle that are sent by the steering wheel rotation angle sensor and the yaw rate sensor module, the wheel speed signal, status information of the battery pack, and status information of the four motors to control the four motors. When the electric vehicle has a side slip and is about to enter a side slip limit interval, the motor controller controls the active safety control system to enter a driving force yaw control mode. When the electric vehicle is in the side slip limit interval, the motor controller controls the active safety control system to simultaneously enter the driving force yaw control mode and a braking force yaw control mode.

In an embodiment, the wheel speed detection module includes four wheel speed sensors and/or four rotary transformer sensors.

In an embodiment, the yaw rate sensor module includes a yaw angular speed sensor, a vertical acceleration sensor, and a lateral acceleration sensor.

In an embodiment, in a driving process of the electric vehicle, the motor controller calculates a target yaw angular speed of the electric vehicle in real time according to a steering wheel rotation angle signal that is detected by the steering wheel rotation angle sensor and the wheel speed signal, and compares the target yaw angular speed with an actual yaw angular speed, detected by the yaw angular speed sensor, of the electric vehicle, to obtain a yaw angular speed difference $\Delta\psi'$. At the same time, the motor controller calculates a rear shaft slip angle of the electric vehicle according to the wheel speed signal, the steering wheel rotation angle signal, the actual yaw angular speed of the electric vehicle, and a lateral acceleration, detected by the lateral acceleration sensor, of the electric vehicle. The motor controller calculates a yaw moment difference $\Delta M$ between a target yaw moment and an actual yaw moment of the electric vehicle in real time according to the target yaw angular speed and the actual yaw angular speed of the electric vehicle and by using overall vehicle rotary inertia of the electric vehicle. When the yaw angular speed difference $\Delta\psi'$ is greater than a first preset angular speed and is less than or equal to a second preset angular speed or the rear shaft slip angle is greater than a first preset angle and is less than or equal to a second preset angle, the motor controller controls the active safety control system to enter the driving force yaw control mode. When the yaw angular speed difference $\Delta\psi'$ is greater than the second preset angular speed or the rear shaft slip angle is greater than the second preset angle, the motor controller controls the active safety control system to simultaneously enter the driving force yaw control mode and the braking force yaw control mode.

In an embodiment, after the active safety control system enters the driving force yaw control mode, the motor controller performs calculation by using an overall vehicle dynamics model and a tire model and according to driving forces of the four wheels of the electric vehicle in a current state, to obtain a first opposite yaw moment, and performs yaw control on the electric vehicle according to the first opposite yaw moment, to calibrate an attitude of the electric vehicle. After the active safety control system simultaneously enters the driving force yaw control mode and the braking force yaw control mode, the motor controller performs calculation by using the overall vehicle dynamics model and the tire model and according to the driving forces of the four wheels of the electric vehicle in a current state and a braking force, to obtain a second opposite yaw moment to cancel out the yaw moment difference $\Delta M$, to enable the electric vehicle to enter a stable state.

In an embodiment, when the motor controller determines that the electric vehicle is in an understeer state and front wheels of the electric vehicle have a side slip, if the yaw angular speed difference $\Delta\psi'$ is greater than the first preset angular speed and is less than or equal to the second preset angular speed, the motor controller controls a motor corresponding to the left-rear wheel of the four wheels to increase a driving force; and if the yaw angular speed difference $\Delta\psi'$ is greater than the second preset angular speed, the motor controller controls the motor corresponding to the left-rear wheel to increase a driving force, and at the same time controls a motor corresponding to the right-rear wheel of the four wheels to brake.

In an embodiment, when the motor controller determines that the electric vehicle is in an oversteer state and rear wheels of the electric vehicle have a side slip, if the rear shaft slip angle is greater than the first preset angle and is less than or equal to the second preset angle, the motor controller controls a motor corresponding to the right-front wheel of the four wheels to increase a driving force; and if the rear shaft slip angle is greater than the second preset angle, the motor controller controls the motor corresponding to the right-front wheel to increase a driving force, and at the same time controls a motor corresponding to the left-front wheel of the four wheels to brake.

To achieve the foregoing objectives, the present disclosure further provides a control method for an active safety control system of an electric vehicle, including the following steps: detecting a wheel speed of the electric vehicle to generate a wheel speed signal, and detecting a status signal of the electric vehicle; and generating a control instruction according to the status signal of the electric vehicle, the wheel speed signal, status information of a battery pack of the electric vehicle, and status information of four motors of the electric vehicle to control the four motors, where when the electric vehicle has a side slip and is about to enter a side slip limit interval, the active safety control system is controlled to enter a driving force yaw control mode, and when the electric vehicle is in the side slip limit interval, the active safety control system is controlled to simultaneously enter the driving force yaw control mode and a braking force yaw control mode.

In an embodiment, the status signal of the electric vehicle includes a steering wheel rotation angle signal, an actual yaw angular speed of the electric vehicle, and a lateral acceleration of the electric vehicle.

In an embodiment, in a driving process of the electric vehicle, a target yaw angular speed of the electric vehicle is calculated in real time according to the steering wheel rotation angle signal and the wheel speed signal, and the target yaw angular speed is compared with the actual yaw angular speed of the electric vehicle to obtain a yaw angular speed difference $\Delta\psi'$. A rear shaft slip angle of the electric vehicle is further calculated at the same time according to the wheel speed signal, the steering wheel rotation angle signal, the actual yaw angular speed of the electric vehicle, and the lateral acceleration of the electric vehicle, and a yaw moment difference $\Delta M$ between a target yaw moment and an actual yaw moment of the electric vehicle is calculated in real time according to the target yaw angular speed and the actual yaw angular speed of the electric vehicle and by using overall vehicle rotary inertia of the electric vehicle. When the yaw angular speed difference $\Delta\psi'$ is greater than a first preset angular speed and is less than or equal to a second preset angular speed or the rear shaft slip angle is greater than a first preset angle and is less than or equal to a second preset angle, the active safety control system is controlled to enter the driving force yaw control mode. When the yaw angular speed difference $\Delta\psi'$ is greater than the second preset angular speed or the rear shaft slip angle is greater than the second preset angle, the active safety control system is controlled to simultaneously enter the driving force yaw control mode and the braking force yaw control mode.

In an embodiment, after the active safety control system enters the driving force yaw control mode, calculation is performed by using an overall vehicle dynamics model and a tire model and according to driving forces of the four wheels of the electric vehicle in a current state, to obtain a first opposite yaw moment, and yaw control is performed on the electric vehicle according to the first opposite yaw moment, to calibrate an attitude of the electric vehicle. After the active safety control system simultaneously enters the driving force yaw control mode and the braking force yaw control mode, calculation is performed by using the overall vehicle dynamics model and the tire model and according to the driving forces of the four wheels of the electric vehicle in a current state and a braking force, to obtain a second opposite yaw moment to cancel out the yaw moment difference ΔM, to enable the electric vehicle to enter a stable state.

In an embodiment, when it is determined that the electric vehicle is in an understeer state and front wheels of the electric vehicle have a side slip, if the yaw angular speed difference Δψ' is greater than the first preset angular speed and is less than or equal to the second preset angular speed, a motor corresponding to the left-rear wheel of the four wheels of the electric vehicle is controlled to increase a driving force; and if the yaw angular speed difference Δψ' is greater than the second preset angular speed, the motor corresponding to the left-rear wheel is controlled to increase a driving force, and a motor corresponding to the right-rear wheel of the four wheels is at the same time controlled to brake.

In an embodiment, when it is determined that the electric vehicle is in an oversteer state and rear wheels of the electric vehicle have a side slip, if the rear shaft slip angle is greater than the first preset angle and is less than or equal to the second preset angle, a motor corresponding to the right-front wheel of the four wheels of the electric vehicle is controlled to increase a driving force; and if the rear shaft slip angle is greater than the second preset angle, the motor corresponding to the right-front wheel is controlled to increase a driving force, and at the same time a motor corresponding to the left-front wheel of the four wheels is controlled to brake.

Additional aspects and advantages of the present disclosure will be given in part in the following descriptions, become apparent in part from the following descriptions, or be learned from the practice of the present disclosure.

BRIEF DESCRIPTION OF THE DRAWINGS

The foregoing and other aspects and advantages of the present disclosure will become apparent and more readily appreciated from the following descriptions of the embodiments made with reference to the drawings, in which.

DETAILED DESCRIPTION

Figure 1:
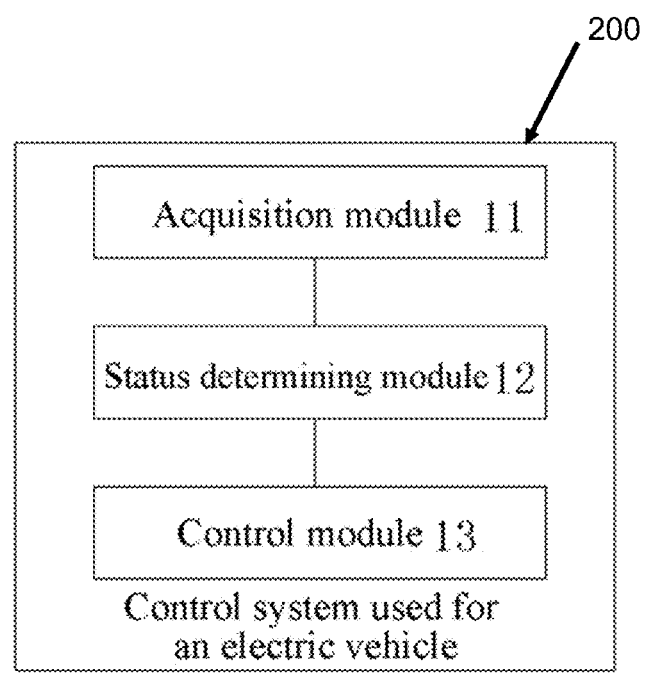
FIG. 1 is a structural block diagram of an active safety control system of an electric vehicle according to an embodiment of the present disclosure.

Reference will be made in detail to embodiments of the present disclosure. The embodiments described herein with reference to drawings are explanatory, illustrative, and should be used to generally understand the present disclosure. The embodiments shall not be construed to limit the present disclosure. The same or similar elements and the elements having same or similar functions are denoted by like reference numerals throughout the descriptions.

The disclosure below provides many different embodiments or examples to implement different structures of the present disclosure. To simplify the disclosure of the present disclosure, the components and settings in the specific examples below are described. Certainly, these are merely examples, and the objective is not to limit the present disclosure. In addition, in the present disclosure, reference numerals and/or letters may be repeated in different examples. Such repetition is for the purpose of simplification and clarity, but the repeated numerals and/or letters do not indicate relationships between discussed various embodiments and/or settings. In addition, the present disclosure provides examples of various specific processes and materials, but a person of ordinary skill in the art may realize applicability of another process and/or use of another material. In addition, the structure in which the first feature is "on" the second feature described below may include an embodiment in which the first and second features are form directly contacting each other, or may include an embodiment in which an additional feature is formed between the first and second features, so that the first and second features may not contact directly.

In the description of the present disclosure, it should be understood that, unless specified or limit otherwise, the terms "mounted," "connected," and "coupled" and variations thereof are used broadly and encompass such as mechanical or electrical mountings, connections and couplings, also can be inner mountings, connections and couplings of two components, and further can be direct mountings, connections, and couplings and indirect mountings, connections, and couplings by using an intermediate medium, and the specific meanings of the foregoing terms can be understood by those skilled in the art according to the specific cases.

An active safety control system of an electric vehicle, a control method for an active safety control system of an electric vehicle, and an electric vehicle having the active safety control system according to embodiments of the present disclosure are described below with reference to the accompanying drawings.

FIG. 1 is a structural block diagram of an active safety control system of an electric vehicle according to this embodiment of the present disclosure. The electric vehicle includes: multiple wheels, multiple transmissions respectively connected to the multiple wheels, multiple motors that are respectively connected to the multiple transmissions to respectively correspond to the multiple wheels, a wheel speed detection module configured to detect a wheel speed of the multiple wheels to generate a wheel speed signal, a steering wheel rotation angle sensor configured to detect direction information of the electric vehicle, a yaw rate sensor configured to detect yaw information of the electric vehicle, and a battery pack.

As shown in FIG. 1, the active safety control system 200 includes an acquisition module 11, a status determining module 12, and a control module 13.

The acquisition module 11 is connected to the wheel speed detection module, the steering wheel rotation angle sensor, the yaw rate sensor, the battery pack, and the multiple motors of the electric vehicle, and is configured to acquire the wheel speed signal, the direction information of the electric vehicle, the yaw information of the electric vehicle, status information of the battery pack, and status information of the multiple motors.

The yaw rate sensor may include a yaw angular speed sensor, a vertical acceleration sensor, and a lateral acceleration sensor. The direction information of the electric vehicle may be a steering wheel rotation angle signal detected by the steering wheel rotation angle sensor. The yaw information of the electric vehicle includes: an actual yaw angular speed detected by the yaw angular speed sensor and a lateral acceleration detected by the lateral acceleration sensor.

The status determining module 12 is configured to determine status of the electric vehicle according to the wheel speed signal, the direction information of the electric vehicle, and the yaw information of the electric vehicle. The status of the electric vehicle includes that the electric vehicle has a side slip and is about to enter a side slip limit interval and that the electric vehicle is in the side slip limit interval.

In an embodiment, the status determining module 12 may be further configured to: calculate a target yaw angular speed of the electric vehicle according to the steering wheel rotation angle signal and the wheel speed signal, where specifically, the target yaw angular speed $\psi_{target}'$ may be calculated by using the following formula:

$$\Psi'_{target} = \frac{V_x \times \delta}{L \times \left(1 + \left(\frac{V_x}{V_{ch}}\right)^2\right)},$$

where $V_x$ is a vertical vehicle speed, $\delta$ is a front wheel rotation angle, L is a wheel base, and $V_{ch}$ is a feature vehicle speed;

calculate a rear shaft slip angle of the electric vehicle according to the wheel speed signal, the steering wheel rotation angle signal, the actual yaw angular speed, and the lateral acceleration, where specifically, the rear shaft slip angle $\alpha_r$ may be calculated by using the following formula:

$$\alpha_r = -\beta + \frac{L_r \Psi'}{V_x}$$

where $\beta$ is a mass-center slip angle, $L_r$ is a distance between a center of mass and a rear shaft, $\psi'$ is the actual yaw angular speed, and $V_x$ is the vertical vehicle speed;

acquire a yaw angular speed difference $\Delta\psi'$ between the target yaw angular speed and the actual yaw angular speed; and when the yaw angular speed difference $\Delta\psi'$ is greater than a first preset angular speed and is less than or equal to a second preset angular speed, or the rear shaft slip angle is greater than a first preset angle and is less than or equal to a second preset angle, determine that the electric vehicle has a side slip and is about to enter the side slip limit interval; and when the yaw angular speed difference $\Delta\psi'$ is greater than the second preset angular speed or the rear shaft slip angle is greater than the second preset angle, determine that the electric vehicle is in the side slip limit interval. For example only, when the yaw angular speed difference meets 0.2 rad/s>$\Delta\psi'$>0.1 rad/s, it may be regarded that the electric vehicle has a side slip and is about to enter the side slip limit interval. When the yaw angular speed difference meets $\Delta\psi'$>0.2 rad/s, it may be regarded that the electric vehicle is in the side slip limit interval.

The control module 13 is configured to generate a control instruction according to the status information of the battery pack, the status information of the multiple motors, and the status of the electric vehicle, and deliver the control instruction to at least one motor, to enable the at least one motor to control at least one corresponding wheel according to the control instruction, where when the electric vehicle has a side slip and is about to enter the side slip limit interval, the control instruction enables the at least one motor to perform driving control on the at least one corresponding wheel; and when the electric vehicle is in the side slip limit interval, the control instruction enables the at least one motor to perform braking control on the at least one corresponding wheel.

In an embodiment, the control module 13 may be further configured to:

acquire driving forces of the multiple wheels;
acquire braking forces of the multiple wheels; and
calculate a target yaw moment of the electric vehicle according to the target yaw angular speed and overall vehicle rotary inertia of the electric vehicle, and acquire a yaw moment difference $\Delta M$ between the target yaw moment and an actual yaw moment, where the actual yaw moment is detected by the yaw angular speed sensor, and the target yaw moment $M_{target}$ may be calculated by using the following formula:

$$M_{target} = I \times \psi_{target}'$$

where I is the rotary inertia of the overall vehicle about a Z axis, and the yaw moment difference $\Delta M$ may be calculated by using the following formula:

$$\Delta M = I \times (\psi_{target}' - \psi'), \text{ where}$$

when the electric vehicle has a side slip and is about to enter the side slip limit interval, calculation is performed according to the status information of the battery pack, the status information of the multiple motors, the driving forces of the multiple wheels, and the yaw moment difference $\Delta M$, to obtain a first opposite yaw moment, and the first opposite yaw moment is delivered to the at least one motor, to enable the at least one motor to control, according to the first opposite yaw moment, the at least one corresponding wheel to drive; and when the electric vehicle is in the side slip limit interval, calculation is performed according to the status information of the battery pack, the status information of the multiple motors, the driving forces of the multiple wheels, the braking forces of the multiple wheels, and the yaw moment difference $\Delta M$, to obtain a second opposite yaw moment, and the second opposite yaw moment is delivered to the at least one motor, to enable the at least one motor to control, according to the second opposite yaw moment, the at least one corresponding wheel to brake.

Because yaw moments provided by driving or braking of the wheels of the electric vehicle are not completely the same, when the wheels are selected to perform control, a wheel that provides the largest force is usually selected to perform control.

In an embodiment, the wheels of the electric vehicle may include the left-front wheel, the right-front wheel, the left-rear wheel, and the right-rear wheel.

If a wheel that has a side slip is a front wheel and the electric vehicle turns right, the control module 13 may be configured to: when the electric vehicle has a side slip and is about to enter the side slip limit interval, calculate, according to the status information of the battery pack, the status information of the multiple motors, the driving forces of the multiple wheels, and the yaw moment difference $\Delta M$, a first driving force needed by the left-rear wheel, and deliver the first driving force to a motor corresponding to the left-rear wheel, to enable the motor corresponding to the left-rear wheel to control the left-rear wheel according to the first driving force; and when the electric vehicle is in the side slip limit interval, calculate, according to the status information of the battery pack, the status information of the multiple motors, the driving forces of the multiple wheels, the braking forces of the multiple wheels, and the yaw moment difference ΔM, a second driving force needed by the left-rear wheel and a first braking force needed by the right-rear wheel, and deliver the second driving force to the motor corresponding to the left-rear wheel and deliver the first braking force to a motor corresponding to the right-rear wheel, to enable the motor corresponding to the left-rear wheel to control the left-rear wheel according to the second driving force and the motor corresponding to the right-rear wheel to control the right-rear wheel according to the first braking force.

If a wheel that has a side slip is a front wheel and the electric vehicle turns left, the control module 13 may be configured to: when the electric vehicle has a side slip and is about to enter the side slip limit interval, calculate, according to the status information of the battery pack, the status information of the multiple motors, the driving forces of the multiple wheels, and the yaw moment difference ΔM, a first driving force needed by the right-rear wheel, and deliver the first driving force to a motor corresponding to the right-rear wheel, to enable the motor corresponding to the right-rear wheel to control the right-rear wheel according to the first driving force; and when the electric vehicle is in the side slip limit interval, calculate, according to the status information of the battery pack, the status information of the multiple motors, the driving forces of the multiple wheels, the braking forces of the multiple wheels, and the yaw moment difference ΔM, a second driving force needed by the right-rear wheel and a first braking force needed by the left-rear wheel, and deliver the second driving force to the motor corresponding to the right-rear wheel and deliver the first braking force to a motor corresponding to the left-rear wheel, to enable the motor corresponding to the right-rear wheel to control the right-rear wheel according to the second driving force and the motor corresponding to the left-rear wheel to control the left-rear wheel according to the first braking force.

If a wheel that has a side slip is a rear wheel and the electric vehicle turns right, the control module 13 may be configured to: when the electric vehicle has a side slip and is about to enter the side slip limit interval, calculate, according to the status information of the battery pack, the status information of the multiple motors, the driving forces of the multiple wheels, and the yaw moment difference ΔM, a third driving force needed by the right-front wheel, and deliver the third driving force to a motor corresponding to the right-front wheel, to enable the motor corresponding to the right-front wheel to control the right-front wheel according to the third driving force; and when the electric vehicle is in the side slip limit interval, calculate, according to the status information of the battery pack, the status information of the multiple motors, the driving forces of the multiple wheels, the braking forces of the multiple wheels, and the yaw moment difference ΔM, a fourth driving force needed by the right-front wheel and a second braking force needed by the left-front wheel, and deliver the fourth driving force to the motor corresponding to the right-front wheel and deliver the second braking force to a motor corresponding to the left-front wheel, to enable the motor corresponding to the right-front wheel to control the right-front wheel according to the fourth driving force and the motor corresponding to the left-front wheel to control the left-front wheel according to the second braking force.

If a wheel that has a side slip is a rear wheel and the electric vehicle turns left, the control module 13 may be configured to: when the electric vehicle has a side slip and is about to enter the side slip limit interval, calculate, according to the status information of the battery pack, the status information of the multiple motors, the driving forces of the multiple wheels, and the yaw moment difference ΔM, a third driving force needed by the left-front wheel, and deliver the third driving force to a motor corresponding to the left-front wheel, to enable the motor corresponding to the left-front wheel to control the left-front wheel according to the third driving force; and when the electric vehicle is in the side slip limit interval, calculate, according to the status information of the battery pack, the status information of the multiple motors, the driving forces of the multiple wheels, the braking forces of the multiple wheels, and the yaw moment difference ΔM, a fourth driving force needed by the left-front wheel and a second braking force needed by the right-front wheel, and deliver the fourth driving force to the motor corresponding to the left-front wheel and deliver the second braking force to a motor corresponding to the right-front wheel, to enable the motor corresponding to the left-front wheel to control the left-front wheel according to the fourth driving force and the motor corresponding to the right-front wheel to control the right-front wheel according to the second braking force.

In an embodiment, the active safety control system used for an electric vehicle may be integrated in a motor controller of the electric vehicle. The foregoing active safety control system may be used as a separate module and mounted in the electric vehicle, or may be integrated in the motor controller of the electric vehicle and applied as a part of the motor controller.

The present disclosure further provides a motor controller, including the foregoing active safety control system used for an electric vehicle.

Figure 2:
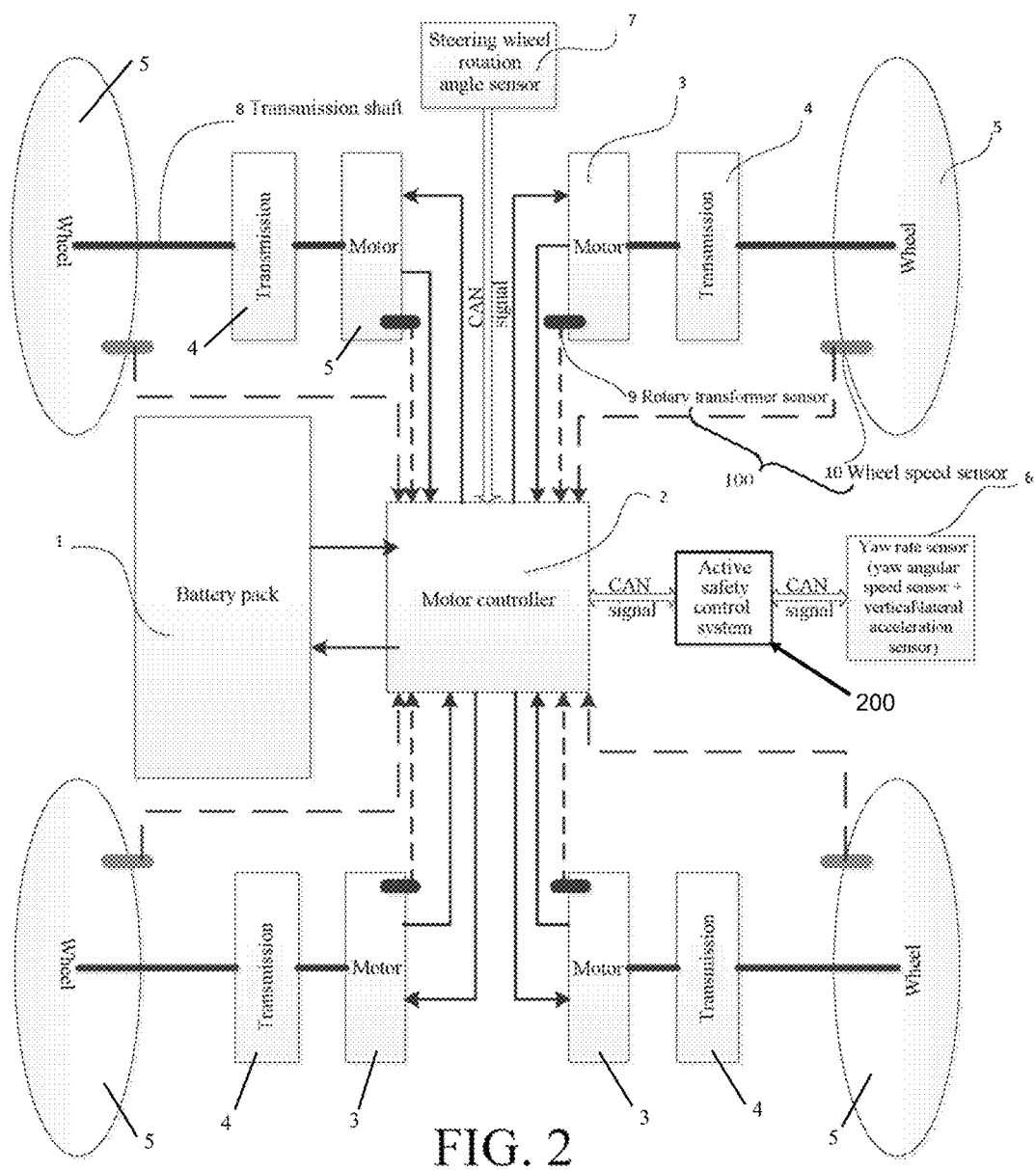
FIG. 2 is a schematic view of an electric vehicle including an active safety control system used for an electric vehicle according to an embodiment of the present disclosure.

The present disclosure further provides an electric vehicle, including the foregoing active safety control system used for an electric vehicle. As shown in FIG. 2, FIG. 2 is a schematic view of an electric vehicle including an active safety control system used for an electric vehicle according to an embodiment of the present disclosure.

As shown in FIG. 2, the electric vehicle includes: four wheels 5, four transmissions 4, four independently controlled motors 3, a wheel speed detection module 100, a steering wheel rotation angle sensor 7, a yaw rate sensor 6, a battery pack 1, four transmission shafts 8, a motor controller 2, and an active safety control system 200.

Each transmission 4 is connected to each wheel 5 by using the transmission shaft 8. Each motor 3 is connected to each transmission 4. The wheel speed detection module 100 is configured to detect a wheel speed of the electric vehicle to generate a wheel speed signal. The motor controller 2 is respectively connected to the battery pack 1 and the four motors 3 by using a high-voltage cable, and the motor controller 2 communicates with the wheel speed detection module 100, the steering wheel rotation angle sensor 7, and the yaw rate sensor 6. The motor controller 2 generates a control instruction according to a status signal of the electric vehicle, the wheel speed signal, status information of the battery pack, and status information of the four motors that are sent by the steering wheel rotation angle sensor 7 and the yaw rate sensor 6, so as to control the four motors 3. When the electric vehicle has a side slip and is about to enter a side slip limit interval, the motor controller 2 controls the active safety control system 200 to enter a driving force yaw control mode, that is, to perform driving control on the wheels of the electric vehicle. When the electric vehicle is in the side slip limit interval, the motor controller 2 controls the active safety control system 200 enters a braking force yaw control mode, that is, to perform braking control on the wheels of the electric vehicle, and preferably, simultaneously enter the driving force yaw control mode and the braking force yaw control mode, that is, to perform driving control on some wheels of the electric vehicle and perform braking control on some wheels.

Specifically, as shown in FIG. 2, the steering wheel rotation angle sensor 7 and the yaw rate sensor 6 send, by using a CAN network, the sensed status signal of the electric vehicle to the motor controller 2. The wheel speed detection module 100 may include four wheel speed sensors 10 and/or four rotary transformer sensors 9. The four rotary transformer sensors 9 and the four wheel speed sensors 10 may be connected to the motor controller 2 by using a rigid cable or the CAN network, and both can provide a function of measuring a wheel speed. Either wheel speed measurement system may be selected, or both wheel speed measurement systems may be selected for mutual checking, where in this case, when one wheel speed measurement system fails, a wheel speed measured by the other wheel speed measurement system can be used as a reference for determining. As shown in FIG. 2, two wheel speed measurement systems respectively formed of the four rotary transformer sensors 9 and the four wheel speed sensors 10 are used in the active safety control system 200 of an electric vehicle in this embodiment of the present disclosure. The four motors 3 are independently controlled and do not affect each other. Each motor 3 is fixedly connected to each transmission 4. Each transmission 4 is connected to each wheel 5 by using the transmission shaft 8.

Therefore, in this embodiment of the present disclosure, the motor controller 2 receives status signals of the members such as the steering wheel rotation angle sensor 7, the yaw rate sensor 6, the rotary transformer sensors 9, the wheel speed sensors 10, the battery pack 1, and the four motors 3, and determines an overall vehicle attitude of the electric vehicle and a road surface condition. When the attitude of the electric vehicle needs to be adjusted, the motor controller 2 performs calculation according to data detected by the steering wheel rotation angle sensor 7, the yaw rate sensor 6, the rotary transformer sensors 9, and the wheel speed sensors 10, to obtain corresponding control information, and sends the control instruction according to both status of the battery pack 1 and capabilities of the four motors 3. The four motors 3 send driving torque or braking torque, and change torque at the wheels to reach target data formulated by the motor controller 2, and at the same time enable the electric vehicle to reach a stable state. During execution, the motor controller 2 monitors in real time status of members such as the steering wheel rotation angle sensor 7, the yaw rate sensor 6, the rotary transformer sensors 9, the wheel speed sensors 10, the battery pack 1, and the four motors 3, performs determining by using received parameters and adjusts target parameters in real time, and at the same time sends the control instruction to the four motors 3.

According to an embodiment of the present disclosure, the yaw rate sensor includes a yaw angular speed sensor, a vertical acceleration sensor, and a lateral acceleration sensor.

Moreover, in a driving process of the electric vehicle, the motor controller 2 calculates the target yaw angular speed of the electric vehicle in real time according to a steering wheel rotation angle signal detected by the steering wheel rotation angle sensor 7 and the wheel speed signal, and compares the target yaw angular speed with an actual yaw angular speed, detected by the yaw angular speed sensor, of the electric vehicle, to obtain a yaw angular speed difference $\Delta\psi'$. At the same time, the motor controller 2 calculates a rear shaft slip angle $\beta$ of the electric vehicle according to the wheel speed signal, the steering wheel rotation angle signal, the actual yaw angular speed of the electric vehicle, and a lateral acceleration, detected by the lateral acceleration sensor, of the electric vehicle, and the motor controller 2 calculates a yaw moment difference $\Delta M$ between a target yaw moment and an actual yaw moment of the electric vehicle in real time according to the target yaw angular speed and the actual yaw angular speed of the electric vehicle and by using overall vehicle rotary inertia of the electric vehicle. A yaw angular speed difference threshold $\psi 1$, that is, a first preset angular speed is further set in the motor controller 2. The rear shaft slip angle threshold value $\beta 1$ is a first preset angle (a motor driving engaged yaw control threshold), the yaw angular speed difference threshold $\psi 2$ is a second preset angular speed, and the rear shaft slip angle threshold value $\beta 2$ is a second preset angle (a motor braking engaged yaw control threshold, that is, an ESP engaged threshold).

It should be noted that in this embodiment of the present disclosure, if the yaw angular speed difference $\Delta\psi'$ is less than the first preset angular speed or the rear shaft slip angle is less than the first preset angle, it indicates that the electric vehicle does not have a side slip, the overall vehicle is very stable, and the active safety control system 200 does not need to be engaged for control. If the yaw angular speed difference $\Delta\psi'$ is greater than the first preset angular speed and is less than or equal to the second preset angular speed or the rear shaft slip angle is greater than the first preset angle and is less than or equal to the second preset angle, it indicates that the electric vehicle has a side slip and is about to enter the side slip limit interval, the active safety control system 200 needs to be controlled to enter a driving force yaw control mode. If the yaw angular speed difference $\Delta\psi'$ is greater than the second preset angular speed or the rear shaft slip angle is greater than the second preset angle, it indicates that the electric vehicle is in the side slip limit interval, and the active safety control system 200 needs to be controlled to simultaneously enter the driving force yaw control mode and a braking force yaw control mode.

When the yaw angular speed difference $\Delta\psi'$ is greater than the first preset angular speed and is less than or equal to the second preset angular speed or the rear shaft slip angle is greater than the first preset angle and is less than or equal to the second preset angle, it indicates that the electric vehicle has a side slip and is about to enter the side slip limit interval, and the motor controller 2 controls the active safety control system 200 to enter the driving force yaw control mode. Moreover, after the active safety control system 200 enters the driving force yaw control mode, the motor controller 2 performs calculation by using an overall vehicle dynamics model and a tire model and according to driving forces of the four wheels of the electric vehicle in a current state, to obtain a first opposite yaw moment (opposite to the direction of $\Delta M$), and performs yaw control on the electric vehicle according to the first opposite yaw moment, to calibrate an attitude of the electric vehicle. That is, the motor controller 2 performs calculation to obtain a corresponding usable active control yaw moment value by each wheel, and selects, according to the calculated four usable active control yaw moment values, to increase driving forces of wheels corresponding to one or two largest usable active control yaw moment values to perform yaw moment control, so that a turning speed of the electric vehicle can be improved, and the attitude of the electric vehicle can be corrected, and operational stability of the electric vehicle can be improved. It should be noted that a direction of torque of a same wheel changes as the attitude of the vehicle changes. For example, at a moment T1, torque of the left-front wheel is usable, and at a moment T2, torque of the left-front wheel may have an opposite effect and becomes unusable. Therefore, opposite yaw moments of the four wheels are instantaneous, and are usable active control yaw moments in brief.

When the yaw angular speed difference $\Delta\psi'$ is greater than the second preset angular speed or the rear shaft slip angle is greater than the second preset angle, it may be regarded that the electric vehicle enters a limit-attachment side-slip working condition, that is, is in the side slip limit interval, and the motor controller 2 controls the active safety control system 200 to simultaneously enter the driving force yaw control mode and the braking force yaw control mode. Moreover, after the active safety control system 200 simultaneously enters the driving force yaw control mode and the braking force yaw control mode, the motor controller 2 performs calculation by using the overall vehicle dynamics model and the tire model and according to driving forces and braking forces of the four wheels of the electric vehicle in a current state, to obtain a second opposite yaw moment to cancel out the yaw moment difference $\Delta M$, to enable the electric vehicle to enter a stable state. Compared with a conventional ESP, the electric vehicle can enter a stable state more rapidly.

Figure 3:
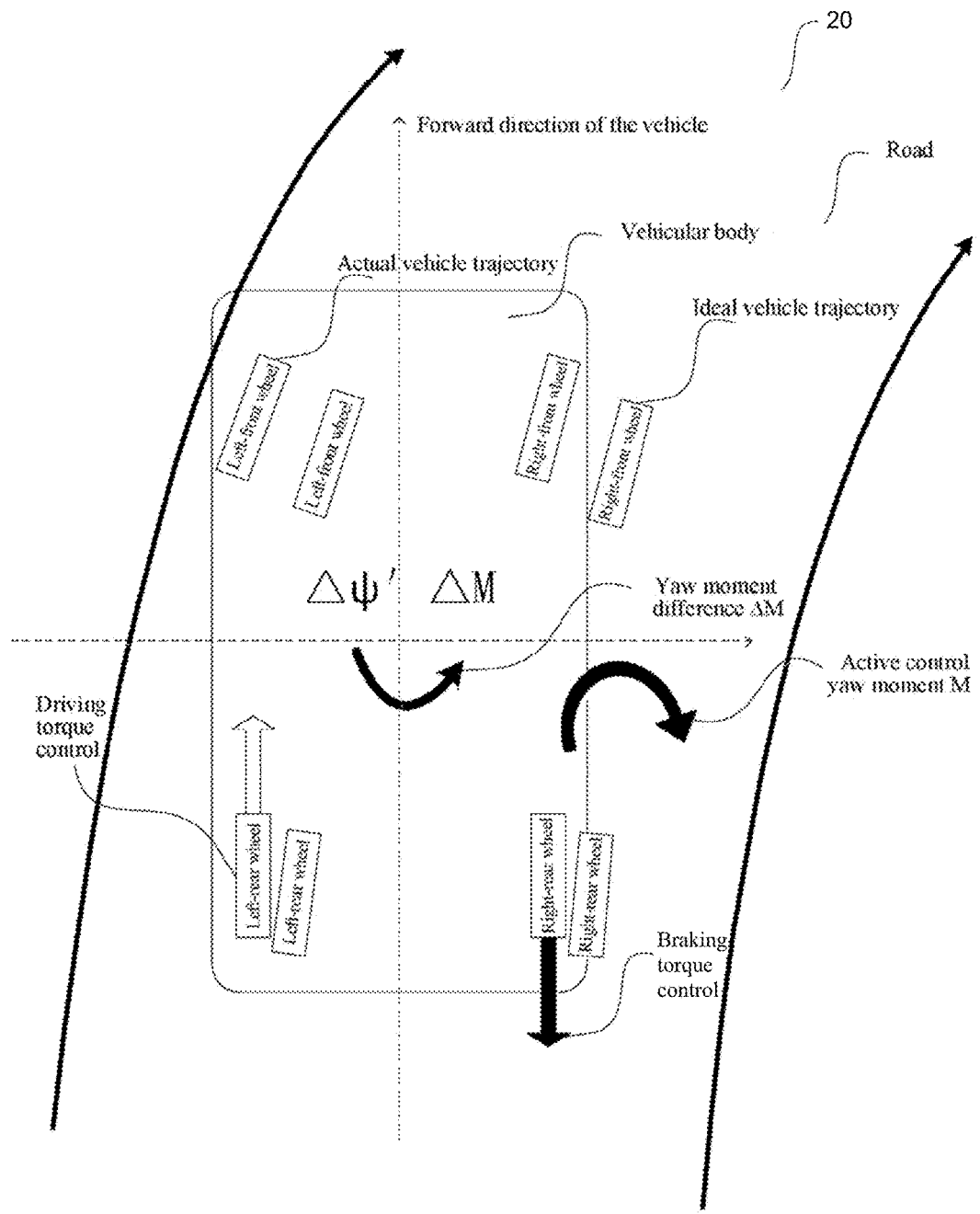
FIG. 3 and FIG. 4 are schematic views of active safety control performed on an electric vehicle by an active safety control system when the electric vehicle understeers according to an embodiment of the present disclosure.
Figure 4:
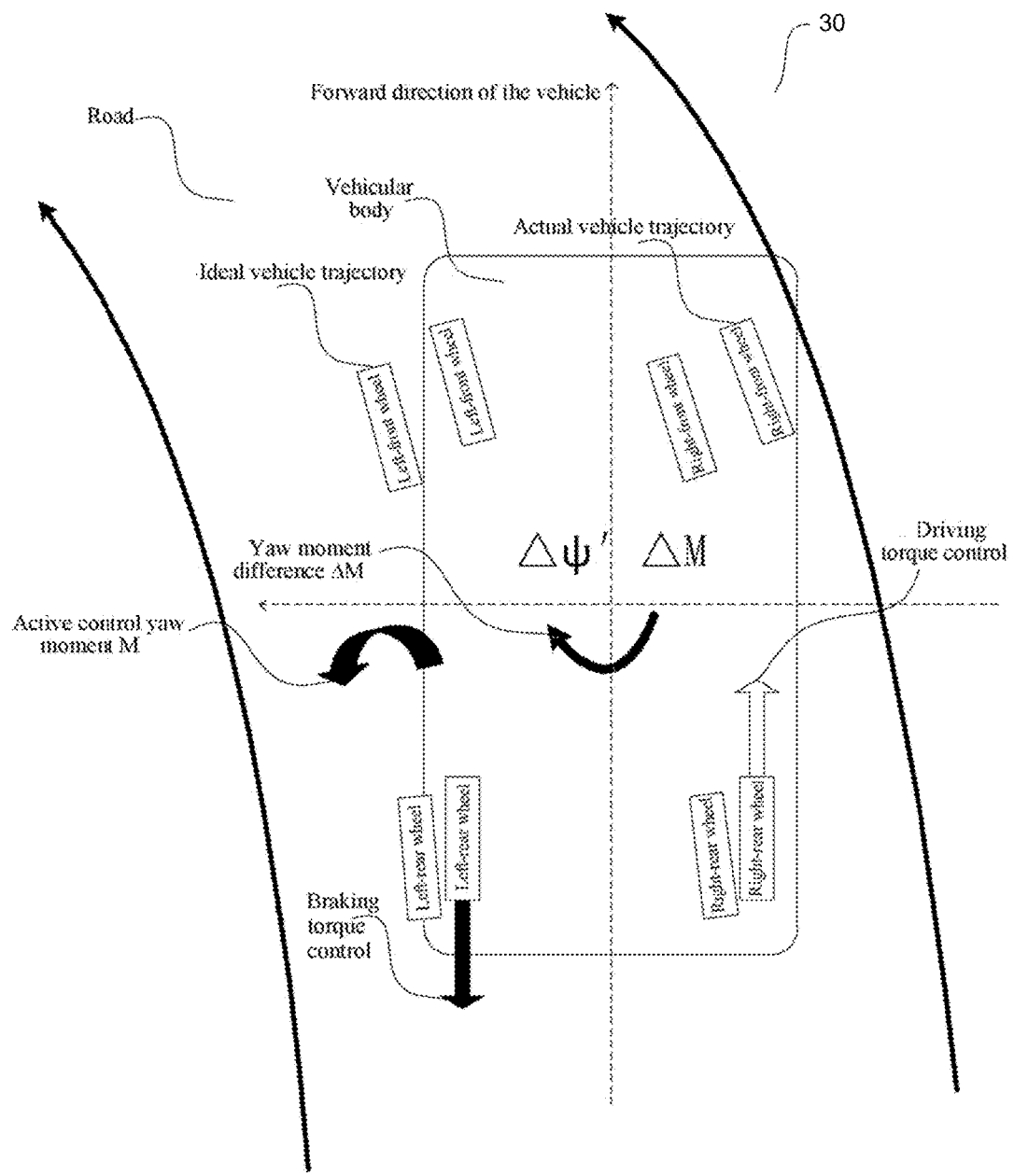

FIG. 3 and FIG. 4 show that the electric vehicle is in an understeer state, where FIG. 3 shows an electric vehicle understeering left 20, and FIG. 4 shows an electric vehicle understeering right 30.

According to this embodiment of the present disclosure, as shown in FIG. 3, when the electric vehicle is in a left-turn understeer state and front wheels of the electric vehicle have a side slip, if the yaw angular speed difference $\Delta\psi'$ is greater than the first preset angular speed and is less than or equal to the second preset angular speed, a motor corresponding to the right-rear wheel of the four wheels of the electric vehicle is controlled to increase a driving force; and if the yaw angular speed difference $\Delta\psi'$ is greater than the second preset angular speed, the motor corresponding to the right-rear wheel is controlled to increase a driving force, and at the same time a motor corresponding to the left-rear wheel of the four wheels is controlled to brake.

According to this embodiment of the present disclosure, as shown in FIG. 4, when the electric vehicle is in a right-turn understeer state and front wheels of the electric vehicle have a side slip, if the yaw angular speed difference $\Delta\psi'$ is greater than the first preset angular speed and is less than or equal to the second preset angular speed, the motor controller 2 controls a motor corresponding to the left-rear wheel of the four wheels to increase a driving force, to ensure an active yaw moment generated by the driving force $M=-\Delta M$, thereby improving a turning speed of the electric vehicle and improving an operational stability characteristic of the electric vehicle; and if the yaw angular speed difference $\Delta\psi'$ is greater than the second preset angular speed, the motor controller 2 controls the motor corresponding to the left-rear wheel to increase a driving force, and at the same time controls a motor corresponding to the right-rear wheel of the four wheels to brake, to ensure that an active yaw moment $M=-\Delta M$, to enable the electric vehicle to enter a stable state as soon as possible. When a difference between the actual yaw angular speed and the target yaw angular speed of the electric vehicle is greater than a set threshold value, but slip angles of the rear wheels do not reach set threshold values, it indicates that the front wheels understeer.

Figure 5:
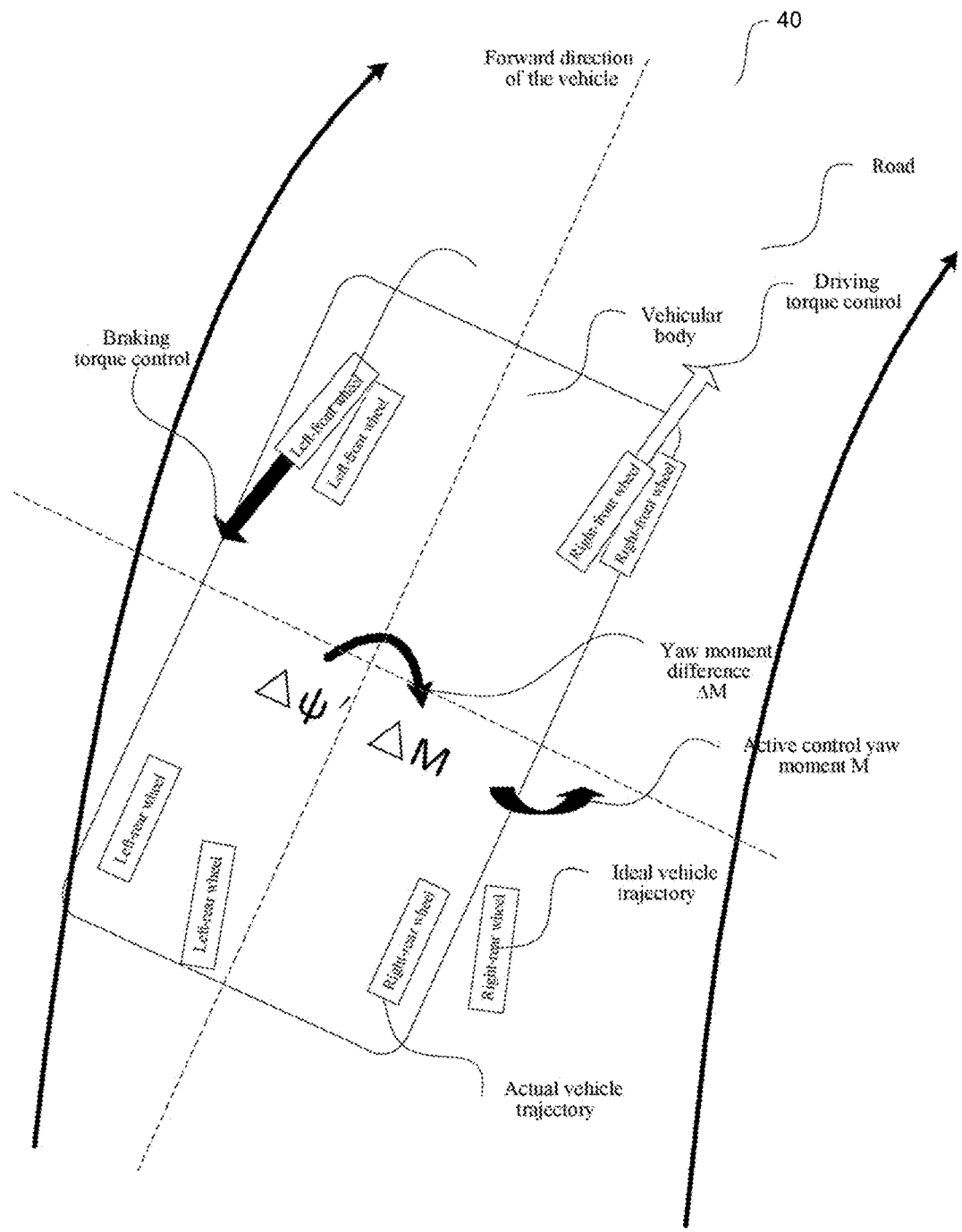
FIG. 5 and FIG. 6 are schematic views of active safety control performed on an electric vehicle by an active safety control system when the electric vehicle oversteers according to another embodiment of the present disclosure.
Figure 6:
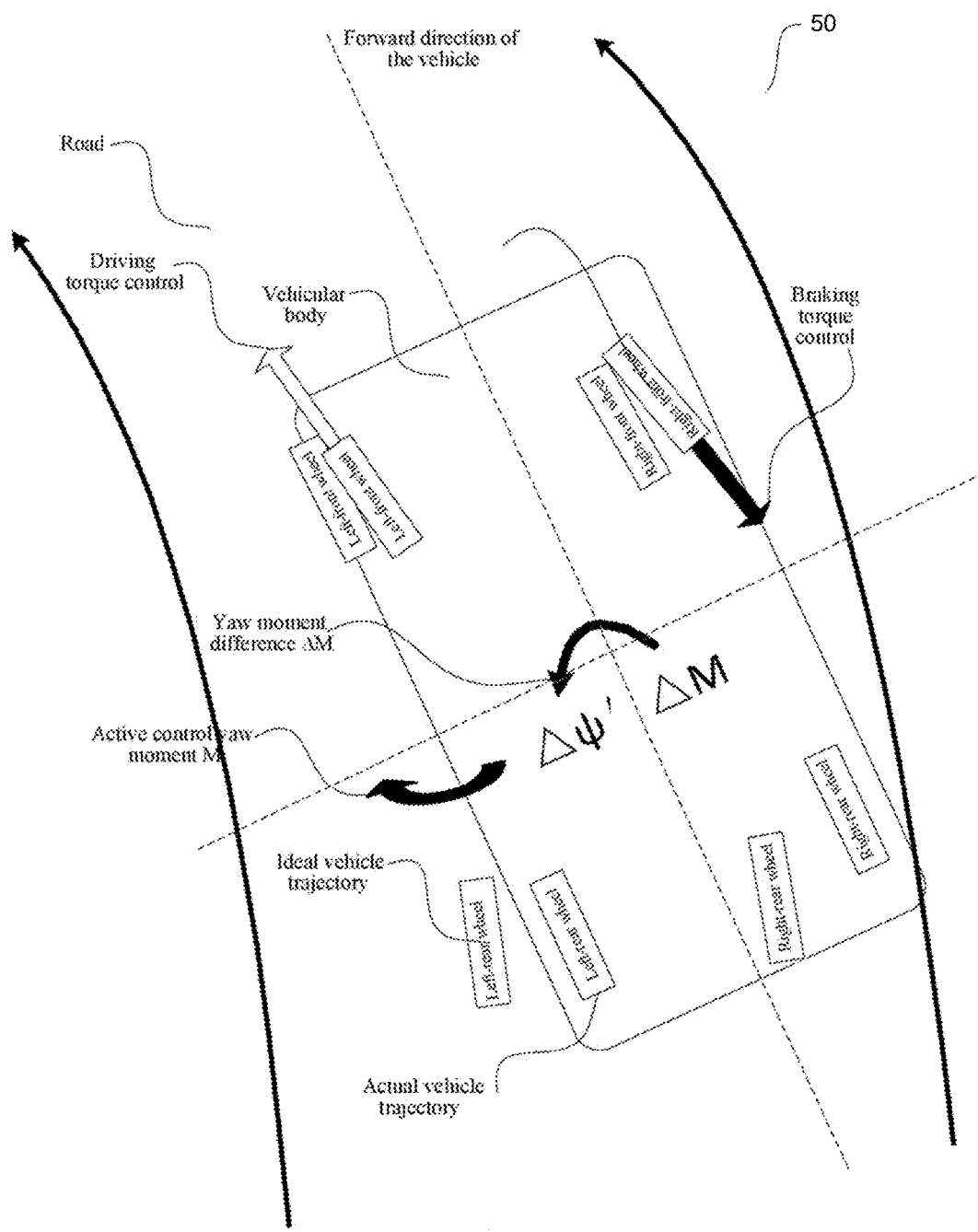

FIG. 5. and FIG. 6 show that the electric vehicle is in an oversteer state, where FIG. 5 shows an electric vehicle oversteering left 40, and FIG. 6 shows an electric vehicle oversteering right 50. When the electric vehicle is in an oversteer state, rear wheels of the electric vehicle have a side slip.

According to this embodiment of the present disclosure, as shown in FIG. 5, when the electric vehicle is in a left-turn oversteer state and the rear wheels of the electric vehicle have a side slip, if the rear shaft slip angle is greater than the first preset angle and is less than or equal to the second preset angle, a motor corresponding to the left-front wheel of the four wheels of the electric vehicle is controlled to increase a driving force; and if the rear shaft slip angle is greater than the second preset angle, the motor corresponding to the left-front wheel is controlled to increase a driving force, and at the same time a motor corresponding to the right-front wheel of the four wheels is controlled to brake.

According to this embodiment of the present disclosure, as shown in FIG. 6, when the electric vehicle is in a right-turn oversteer state and the rear wheels of the electric vehicle have a side slip, if the rear shaft slip angle is greater than the first preset angle and is less than or equal to the second preset angle, the motor controller 2 controls a motor corresponding to the right-front wheel of the four wheels to increase a driving force, to ensure that an active yaw moment generated by the driving force $M=-\Delta M$, thereby improving a turning speed of the electric vehicle and improving an operational stability characteristic of the electric vehicle; and if the rear shaft slip angle is greater than the second preset angle, the motor controller 2 controls the motor corresponding to the right-front wheel to increase a driving force, and at the same time controls a motor corresponding to the left-front wheel of the four wheels to brake, to ensure that the active yaw moment $M=-\Delta M$, to enable the electric vehicle to enter a stable state as soon as possible. When the slip angles of the rear wheels reach set threshold values, but a difference between the actual yaw angular speed and the target yaw angular speed of the electric vehicle does not reach a set threshold value, it indicates that the rear wheels oversteer.

For the active safety control system of an electric vehicle according to this embodiment of the present disclosure, when the electric vehicle has a side slip and is about to enter the side slip limit interval, a motor controller controls the active safety control system to enter a driving force yaw control mode, to perform yaw control on the electric vehicle by using a driving force of a motor, so as to correct an attitude of the electric vehicle, improve a turning speed of the electric vehicle, avoid a decrease in a vehicle speed caused by braking, and improve operational stability of the electric vehicle. When the electric vehicle is in the side slip limit interval, the motor controller controls the active safety control system to simultaneously enter the driving force yaw control mode and a braking force yaw control mode, to perform yaw control on the electric vehicle by using a driving force and a braking force of a corresponding motor, so as to enable the electric vehicle enter a stable state more rapidly, thereby improving safety of the electric vehicle. Therefore, for the active safety control system of an electric vehicle in this embodiment of the present disclosure, a drive architecture of an all-wheel hub motor plus a transmission plus a transmission shaft is disposed, which not only facilitates space arrangement, but also can significantly improve driving and braking feedback capabilities of the electric vehicle, so that the problems of a complex system, a high cost, and a slow response speed that exist in the existing hydraulic electronic stable control system are resolved, and operational stability and safety of a vehicle can further be greatly improved.

For the electric vehicle according to this embodiment of the present disclosure, when the electric vehicle has a side slip and is about to enter the side slip limit interval, the active safety control system is controlled to enter a driving force yaw control mode, to perform yaw control by using a driving force of a motor, so as to correct an attitude of the electric vehicle, improve a turning speed, avoid a decrease in a vehicle speed caused by braking, and improve operational stability. When the electric vehicle is in the side slip limit interval, the active safety control system is controlled to simultaneously enter the driving force yaw control mode and a braking force yaw control mode, to perform yaw control by using a driving force and a braking force of a corresponding motor, so as to enable the electric vehicle to enter a stable state more rapidly, thereby improving safety.

Figure 7:
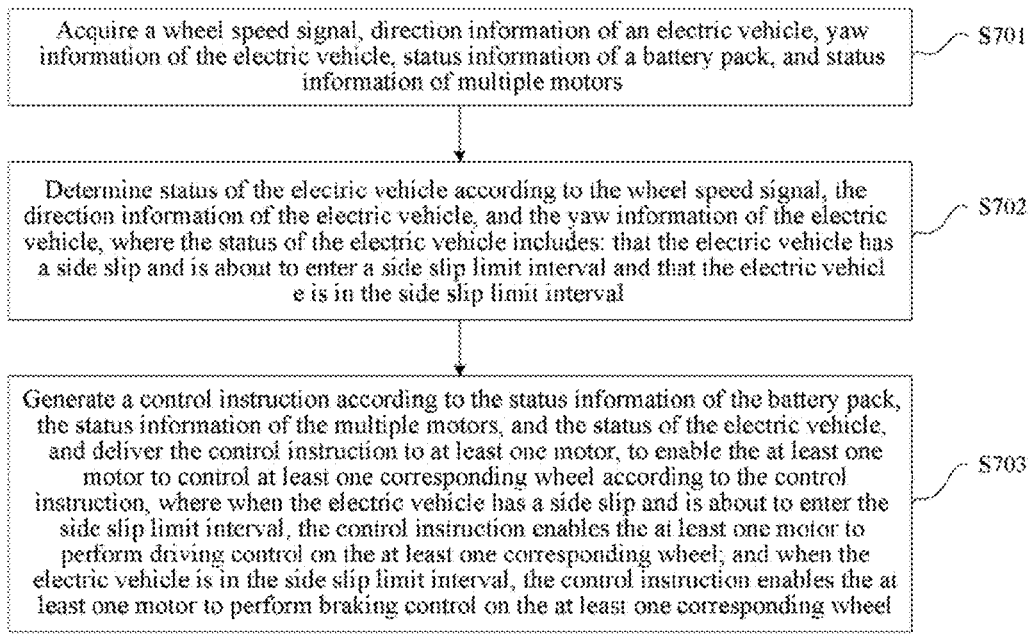
FIG. 7 is a flowchart of a control method for an active safety control system of an electric vehicle according to an embodiment of the present disclosure.

FIG. 7 is a flowchart of a control method for an active safety control system of an electric vehicle according to an embodiment of the present disclosure. The active safety control system may be the active safety control system of an electric vehicle described in the foregoing embodiment. As shown in FIG. 7, the control method for an active safety control system of an electric vehicle includes the following steps:

S701: Acquire a wheel speed signal, direction information of the electric vehicle, yaw information of the electric vehicle, status information of a battery pack, and status information of multiple motors.

The yaw information of the electric vehicle includes an actual yaw angular speed of the electric vehicle and a lateral acceleration of the electric vehicle. The direction information of the electric vehicle may be detected by using a steering wheel rotation angle sensor, and the actual yaw angular speed of the electric vehicle and the lateral acceleration of the electric vehicle may be detected by using a yaw rate sensor.

S702: Determine status of the electric vehicle according to the wheel speed signal, the direction information of the electric vehicle, and the yaw information of the electric vehicle, where the status of the electric vehicle includes that the electric vehicle has a side slip and is about to enter a side slip limit interval and that the electric vehicle is in the side slip limit interval.

S703: Generate a control instruction according to the status information of the battery pack, the status information of the multiple motors, and the status of the electric vehicle, and deliver the control instruction to at least one motor, to enable the at least one motor to control at least one corresponding wheel according to the control instruction, where when the electric vehicle has a side slip and is about to enter the side slip limit interval, the control instruction enables the at least one motor to perform driving control on the at least one corresponding wheel; and when the electric vehicle is in the side slip limit interval, the control instruction enables the at least one motor to perform braking control on the at least one corresponding wheel.

According to this embodiment of the present disclosure, in a driving process of the electric vehicle, a target yaw angular speed of the electric vehicle is calculated in real time according to a steering wheel rotation angle signal and a wheel speed signal. The target yaw angular speed is compared with the actual yaw angular speed of the electric vehicle to obtain a yaw angular speed difference $\Delta\psi'$. At the same time, a rear shaft slip angle of the electric vehicle is further calculated according to the wheel speed signal, the steering wheel rotation angle signal, the actual yaw angular speed of the electric vehicle, and the lateral acceleration of the electric vehicle. A yaw moment difference $\Delta M$ between a target yaw moment and an actual yaw moment of the electric vehicle is calculated in real time according to the target yaw angular speed and the actual yaw angular speed of the electric vehicle and by using overall vehicle rotary inertia of the electric vehicle. When the yaw angular speed difference $\Delta\psi'$ is greater than a first preset angular speed and is less than or equal to a second preset angular speed or the rear shaft slip angle is greater than a first preset angle and is less than or equal to a second preset angle, in indicates that the electric vehicle has a side slip and is about to enter the side slip limit interval, and the active safety control system is controlled to enter a driving force yaw control mode. When the yaw angular speed difference $\Delta\psi'$ is greater than the second preset angular speed or the rear shaft slip angle is greater than the second preset angle, it may be regarded that the electric vehicle enters a limit-attachment side-slip working condition, that is, is in the side slip limit interval, and the active safety control system is controlled to simultaneously enter the driving force yaw control mode and a braking force yaw control mode.

Moreover, after the active safety control system enters the driving force yaw control mode, calculation is performed by using an overall vehicle dynamics model and a tire model and according to driving forces of four wheels of the electric vehicle in a current state, to obtain a first opposite yaw moment, and yaw control is performed on the electric vehicle according to the first opposite yaw moment, to calibrate an attitude of the electric vehicle. After the active safety control system simultaneously enters the driving force yaw control mode and the braking force yaw control mode, calculation is performed by using the overall vehicle dynamics model and the tire model and according to driving forces of the four wheels of the electric vehicle in a current state and a braking force, to obtain a second opposite yaw moment to cancel out the yaw moment difference $\Delta M$, so that the electric vehicle enters a stable state.

According to this embodiment of the present disclosure, as shown in FIG. 3, when the electric vehicle is in a left-turn understeer state and front wheels of the electric vehicle have a side slip, if the yaw angular speed difference $\Delta\psi'$ is greater than the first preset angular speed and is less than or equal to the second preset angular speed, a motor corresponding to the right-rear wheel of the four wheels of the electric vehicle is controlled to increase a driving force; and if the yaw angular speed difference $\Delta\psi'$ is greater than the second preset angular speed, the motor corresponding to the right-rear wheel is controlled to increase a driving force, and at the same time a motor corresponding to the left-rear wheel of the four wheels is controlled to brake.

According to this embodiment of the present disclosure, as shown in FIG. 4, when it is determined that the electric vehicle is in a right-turn understeer state and front wheels of the electric vehicle have a side, if the yaw angular speed difference $\Delta\psi'$ is greater than the first preset angular speed and is less than or equal to the second preset angular speed, a motor corresponding to the left-rear wheel of the four wheels of the electric vehicle is controlled to increase a driving force; and if the yaw angular speed difference $\Delta\psi'$ is greater than the second preset angular speed, the motor corresponding to the left-rear wheel is controlled to increase a driving force, and at the same time a motor corresponding to the right-rear wheel of the four wheels is controlled to brake.

According to this embodiment of the present disclosure, as shown in FIG. 5, when the electric vehicle is in a left-turn oversteer state and rear wheels of the electric vehicle have a side slip, if the rear shaft slip angle is greater than the first preset angle and is less than or equal to the second preset angle, a motor corresponding to the left-front wheel of the four wheels of the electric vehicle is controlled to increase a driving force; and if the rear shaft slip angle is greater than the second preset angle, the motor corresponding to the left-front wheel is controlled to increase a driving force, and at the same time a motor corresponding to the right-front wheel of the four wheels is controlled to brake.

According to another embodiment of the present disclosure, as shown in FIG. 6, when it is determined that the electric vehicle is in a right-turn oversteer state and rear wheels of the electric vehicle have a side slip, if the rear shaft slip angle is greater than the first preset angle and is less than or equal to the second preset angle, a motor corresponding to the right-front wheel of the four wheels of the electric vehicle is controlled to increase a driving force; and if the rear shaft slip angle is greater than the second preset angle, the motor corresponding to the right-front wheel is controlled to increase a driving force, and at the same time the motor corresponding to the left-front wheel of the four wheels is controlled to brake.

For the control method for an active safety control system of an electric vehicle according to this embodiment of the present disclosure, when the electric vehicle has a side slip and is about to enter a side slip limit interval, the active safety control system is controlled to enter a driving force yaw control mode, to perform yaw control on the electric vehicle by using a driving force of a motor, so as to correct an attitude of the electric vehicle, improve a turning speed of the electric vehicle, avoid a decrease in a vehicle speed caused by braking, and improve operational stability of the electric vehicle. When the electric vehicle is in the side slip limit interval, the active safety control system is controlled to simultaneously enter the driving force yaw control mode and a braking force yaw control mode, to perform yaw control on the electric vehicle by using a driving force and a braking force of a corresponding motor, so as to enable the electric vehicle enter a stable state more rapidly, thereby improving safety of the electric vehicle.

Any processes or methods described in the flowcharts or in other manners may be understood as modules, segments or parts of code including one or more executable instructions configured to implement steps of specific logic functions or processes, and the scope of the preferred implementation manners of the present disclosure includes other implementations. The functions may be executed in an order other than those shown or discussed. For example, the functions are executed substantially at the same time according to the involved functions or the functions are executed in an opposite order, which should be understood by those skilled in the art to which embodiments of the present disclosure belong.

The logic and/or steps represented in the flowcharts or described herein in other manners may be, for example, regarded as a sequenced list of executable instructions for implementing logic functions, and may be specifically implemented in any computer readable medium for use by instruction execution systems, devices or equipment (for example, a computer-based system, a system including a processor or another system that may take an instruction from instruction execution systems, devices or equipment and execute the instruction), or for use in combination with these instruction execution systems, devices or equipment. As for this specification, the "computer readable medium" may be any device that may include, store, communicate, propagate or transmit a program for use by instruction execution systems, devices or equipment or for use in combination with these instruction execution systems, devices or equipment. A more specific example (a non-exclusive list) of the computer readable medium includes the following: an electronic connection portion (electronic device), a portable computer cassette (magnetic device), a random access memory (RAM), a read-only memory (ROM), an erasable programmable read-only memory (EPROM or flash-drive memory), a fiber device, and a compact disc read-only memory (CDROM) having one or more cables. In addition, the computer readable medium may even be paper or another suitable medium on which the program is printed, because, for example, optical scanning may be performed on the paper or the another medium, the program is then obtained in an electronic manner by means of editing, deciphering or processing in another suitable manner when necessary, and the program is stored in a computer memory.

It would be appreciated that the parts of the present disclosure may be implemented by using hardware, software, firmware or a combination thereof. In the foregoing implementation manner, multiple steps or methods may be implemented by using software or firmware that is stored in a memory and executed by a suitable instruction execution system. For example, during implementation of hardware, as in any another implementation manner, any one or a combination of the following technologies well known in the art may be used for implementation: a discrete logic circuit having a logic gate circuit configured to implement a logic function on a data signal, an application-specific integrated circuit having a suitable combinational logic gate circuit, a programmable gate array (PGA), a field-programmable gate array (FPGA), and the like.

A person of ordinary skill in the art may understand that all or some of the steps carried in the methods of the foregoing embodiments may be implemented by a program instructing relevant hardware. The program may be stored in a computer readable storage medium. When the program runs, the steps of the foregoing method embodiments are performed.

In addition, the functional units in the embodiments of the present disclosure may either be integrated in a processing unit, or each be a separate physical unit; alternatively, two or more of the units are integrated in one unit. The integrated modules may be implemented in the form of hardware or software functional modules. If implemented in the form of software functional modules and sold or used as an independent product, the integrated modules may also be stored in a computer readable storage medium.

The storage medium mentioned in the foregoing may be a read-only memory, a magnetic disk or an optical disc.

In the description of this specification, the description of reference terms such as "one embodiment", "some embodiments", "example", "specific example", or "some examples" refer to that specific features, structures, materials or characteristics that are described with reference to the embodiments or examples are included in at least one embodiment or example of the present disclosure. In this specification, schematic description of the foregoing terms does not necessarily involve the same embodiment or example. Moreover, the described specific features, structures, materials or characteristics may be combined in a suitable manner in any one or more embodiments or examples.

Although the embodiments of the present disclosure are shown and described above, a person of ordinary skill in the art may understand that various changes, modifications, replacements, and variations may be made to these embodiments without departing from the principle and spirit of the present disclosure, and the scope of the present disclosure is defined by the appended claims and equivalents thereof.

What is claimed is:

1. An active safety control system used for an electric vehicle, wherein the electric vehicle comprises:
    multiple wheels,
    multiple transmissions, respectively connected to the multiple wheels,
    multiple motors, respectively connected to the multiple transmissions to respectively correspond to the multiple wheels,
    a wheel speed detection module, configured to detect a wheel speed of the multiple wheels to generate a wheel speed signal,
    a steering wheel rotation angle sensor, configured to detect direction information of the electric vehicle,
    a yaw rate sensor, configured to detect yaw information of the electric vehicle, and
    a battery pack;
    wherein the active safety control system comprises:
    an acquisition module, connected to the wheel speed detection module, the steering wheel rotation angle sensor, the yaw rate sensor, the battery pack, and the multiple motors, and configured to acquire the wheel speed signal, the direction information of the electric vehicle, the yaw information of the electric vehicle, status information of the battery pack, and status information of the multiple motors;
    a status determining module, configured to determine status of the electric vehicle according to the wheel speed signal, the direction information of the electric vehicle, and the yaw information of the electric vehicle, wherein the status of the electric vehicle comprises that the electric vehicle has a side slip and is about to enter a side slip limit interval and that the electric vehicle is in the side slip limit interval;
    a control module, configured to generate a control instruction according to the status information of the battery pack, the status information of the multiple motors, and the status of the electric vehicle, and deliver the control instruction to at least one motor, to enable the at least one motor to control at least one corresponding wheel according to the control instruction, wherein when the electric vehicle has a side slip and is about to enter the side slip limit interval, the control instruction enables the at least one motor to perform driving control on the at least one corresponding wheel; and when the electric vehicle is in the side slip limit interval, the control instruction enables the at least one motor to perform braking control on the at least one corresponding wheel,
    wherein the direction information of the electric vehicle is a steering wheel rotation angle signal that is detected by the steering wheel rotation angle sensor, and the yaw information of the electric vehicle comprises: an actual yaw angular speed detected by the yaw angular speed sensor and a lateral acceleration detected by the lateral acceleration sensor; and
    the status determining module is further configured to:
    calculate a target yaw angular speed of the electric vehicle according to the steering wheel rotation angle signal and the wheel speed signal;
    calculate a rear shaft slip angle of the electric vehicle according to the wheel speed signal, the steering wheel rotation angle signal, the actual yaw angular speed, and the lateral acceleration;
    acquire a yaw angular speed difference $\Delta\psi'$ between the target yaw angular speed and the actual yaw angular speed; and
    when the yaw angular speed difference $\Delta\psi'$ is greater than a first preset angular speed and is less than or equal to a second preset angular speed, or the rear shaft slip angle is greater than a first preset angle and is less than or equal to a second preset angle, determine that the electric vehicle has a side slip and is about to enter the side slip limit interval; or when the yaw angular speed difference $\Delta\psi'$ is greater than the second preset angular speed or the rear shaft slip angle is greater than the second preset angle, determine that the electric vehicle is in the side slip limit interval,
    wherein the control module is further configured to:
    acquire driving forces of the multiple wheels;
    acquire braking forces of the multiple wheels;
    calculate a target yaw moment of the electric vehicle according to the target yaw angular speed and overall vehicle rotary inertia of the electric vehicle, and acquire a yaw moment difference $\Delta M$ between the target yaw moment and an actual yaw moment, wherein the actual yaw moment is detected by the yaw angular speed sensor; and
    when the electric vehicle has a side slip and is about to enter the side slip limit interval, perform calculation according to the status information of the battery pack, the status information of the multiple motors, the driving forces of the multiple wheels, and the yaw moment difference $\Delta M$, to obtain a first opposite yaw moment, and deliver the first opposite yaw moment to the at least one motor, to enable the at least one motor to control, according to the first opposite yaw moment, the at least one corresponding wheel to drive; and when the electric vehicle is in the side slip limit interval, perform calculation according to the status information of the battery pack, the status information of the multiple motors, the driving forces of the multiple wheels, the braking forces of the multiple wheels, and the yaw moment difference $\Delta M$ to obtain a second opposite yaw moment, and deliver the second opposite yaw moment to the at least one motor, to enable the at least one motor to control, according to the second opposite yaw moment, the at least one corresponding wheel to brake.

2. The active safety control system according to claim 1, wherein when the electric vehicle is in the side slip limit interval, the control instruction generated by the control module enables one motor to perform braking control on a corresponding wheel and enables another motor to perform driving control on another corresponding wheel.

3. The active safety control system according to claim 1, wherein the wheel speed detection module comprises a wheel speed sensor and/or a rotary transformer sensor.

4. The active safety control system according to claim 1, wherein the yaw rate sensor comprises a yaw angular speed sensor, a vertical acceleration sensor, and a lateral acceleration sensor.

5. The active safety control system according to claim 1, wherein the multiple wheels comprise: the left-front wheel, the right-front wheel, the left-rear wheel, and the right-rear wheel.

6. The active safety control system according to claim 5, wherein when a wheel that has a side slip is a front wheel and the electric vehicle turns right, the control module is further configured to:
when the electric vehicle has a side slip and is about to enter the side slip limit interval, calculate, according to the status information of the battery pack, the status information of the multiple motors, and the driving forces of the multiple wheels and the yaw moment difference $\Delta M$, a first driving force needed by the left-rear wheel, and deliver the first driving force to a motor corresponding to the left-rear wheel, to enable the motor corresponding to the left-rear wheel to control the left-rear wheel according to the first driving force; and
when the electric vehicle is in the side slip limit interval, calculate, according to the status information of the battery pack, the status information of the multiple motors, the driving forces of the multiple wheels, the braking forces of the multiple wheels, and the yaw moment difference $\Delta M$, a second driving force needed by the left-rear wheel and a first braking force needed by the right-rear wheel, and deliver the second driving force to the motor corresponding to the left-rear wheel and deliver the first braking force to a motor corresponding to the right-rear wheel, to enable the motor corresponding to the left-rear wheel to control the left-rear wheel according to the second driving force and the motor corresponding to the right-rear wheel to control the right-rear wheel according to the first braking force.

7. The active safety control system according to claim 5, wherein when a wheel that has a side slip is a front wheel and the electric vehicle turns left, the control module is further configured to:
when the electric vehicle has a side slip and is about to enter the side slip limit interval, calculate, according to the status information of the battery pack, the status information of the multiple motors, and the driving forces of the multiple wheels and the yaw moment difference $\Delta M$, a first driving force needed by the right-rear wheel, and deliver the first driving force to a motor corresponding to the right-rear wheel, to enable the motor corresponding to the right-rear wheel to control the right-rear wheel according to the first driving force; and
when the electric vehicle is in the side slip limit interval, calculate, according to the status information of the battery pack, the status information of the multiple motors, the driving forces of the multiple wheels, the braking forces of the multiple wheels, and the yaw moment difference $\Delta M$, a second driving force needed by the right-rear wheel and a first braking force needed by the left-rear wheel, and deliver the second driving force to the motor corresponding to the right-rear wheel and deliver the first braking force to a motor corresponding to the left-rear wheel, to enable the motor corresponding to the right-rear wheel to control the right-rear wheel according to the second driving force and the motor corresponding to the left-rear wheel to control the left-rear wheel according to the first braking force.

8. The active safety control system according to claim 5, wherein when a wheel that has a side slip is a rear wheel and the electric vehicle turns right, the control module is further configured to:
when the electric vehicle has a side slip and is about to enter the side slip limit interval, calculate, according to the status information of the battery pack, the status information of the multiple motors, the driving forces of the multiple wheels, and the yaw moment difference $\Delta M$, a third driving force needed by the right-front wheel, and deliver the third driving force to a motor corresponding to the right-front wheel, to enable the motor corresponding to the right-front wheel to control the right-front wheel according to the third driving force; and
when the electric vehicle is in the side slip limit interval, calculate, according to the status information of the battery pack, the status information of the multiple motors, the driving forces of the multiple wheels, the braking forces of the multiple wheels, and the yaw moment difference $\Delta M$, a fourth driving force needed by the right-front wheel and a second braking force needed by the left-front wheel, and deliver the fourth driving force to the motor corresponding to the right-front wheel and deliver the second braking force to a motor corresponding to the left-front wheel, to enable the motor corresponding to the right-front wheel to control the right-front wheel according to the fourth driving force and the motor corresponding to the left-front wheel to control the left-front wheel according to the second braking force.

9. The active safety control system according to claim 5, wherein when a wheel that has a side slip is a rear wheel and the electric vehicle turns left, the control module is further configured to:
when the electric vehicle has a side slip and is about to enter the side slip limit interval, calculate, according to the status information of the battery pack, the status information of the multiple motors, the driving forces of the multiple wheels, and the yaw moment difference $\Delta M$, a third driving force needed by the left-front wheel, and deliver the third driving force to a motor corresponding to the left-front wheel, to enable the motor corresponding to the left-front wheel to control the left-front wheel according to the third driving force; and
when the electric vehicle is in the side slip limit interval, calculate, according to the status information of the battery pack, the status information of the multiple motors, the driving forces of the multiple wheels, the braking forces of the multiple wheels, and the yaw moment difference $\Delta M$, a fourth driving force needed by the left-front wheel and a second braking force needed by the right-front wheel, and deliver the fourth driving force to the motor corresponding to the left-front wheel, and deliver the second braking force to a motor corresponding to the right-front wheel, to enable the motor corresponding to the left-front wheel to control the left-front wheel according to the fourth driving force, and the motor corresponding to the right-front wheel to control the right-front wheel according to the second braking force.

10. The active safety control system according to claim 1, wherein the active safety control system is integrated in a motor controller of the electric vehicle.

11. A motor controller, comprising the active safety control system used for an electric vehicle according to claim 1.

* * * * *